United States Patent [19]
Daniel

[11] 4,332,032
[45] May 25, 1982

[54] ADAPTIVE HYBRID ANTENNA SYSTEM
[75] Inventor: Donald B. Daniel, Northridge, Calif.
[73] Assignee: Lockheed Corporation, Burbank, Calif.
[21] Appl. No.: 42,198
[22] Filed: May 24, 1979
[51] Int. Cl.³ .............................................. H04B 1/10
[52] U.S. Cl. .................................. 455/277; 455/278
[58] Field of Search ............... 325/302, 304, 366, 370, 325/371, 372; 343/725–728, 876, 893, 788, 105 R; 455/272, 277, 278

[56] References Cited
U.S. PATENT DOCUMENTS

| | | | |
|---|---|---|---|
| 2,648,765 | 8/1953 | Young, Jr. | 325/304 |
| 2,904,677 | 9/1959 | Heidester | 325/370 |
| 2,937,268 | 5/1960 | Downie | 325/370 |
| 2,968,718 | 1/1961 | McKesson | 325/366 |
| 3,037,113 | 5/1962 | Bier | 325/370 |
| 3,047,862 | 7/1962 | Jolliffe | 325/370 |
| 3,095,538 | 6/1963 | Silberstein | 325/370 |
| 3,121,229 | 2/1964 | Silverstein | 343/726 |
| 3,365,666 | 1/1968 | Reynders et al. | 325/304 |
| 3,475,687 | 10/1969 | Pierce | 325/304 |
| 3,670,275 | 6/1972 | Kalliomaki et al. | 325/370 |
| 4,035,729 | 7/1977 | Perry | 325/302 |

OTHER PUBLICATIONS

Recent Developments in Reduced Size VLF/LF Communications Antennas–L. L. Lay Nov. 1973, Nat'l. Telecomm. Conference, vol III, Atlanta, Ga. pp. 20D-1→20D-5.

*Primary Examiner*—Marc E. Bookbinder
*Attorney, Agent, or Firm*—Victor A. DiPalma

[57] ABSTRACT

A hybrid antenna system selectively connects an electrical field antenna or a magnetic field antenna to a navigational signal receiver on board an aircraft. The output signal from the electrical field antenna is monitored for the presence of impulse noise, such as precipitation static. The electrical field antenna is normally connected to the receiver since it provides the strongest signal. When impulse noise is detected in the electrical component of the received electromagnetic information signal, the electrical field antenna is disconnected from the receiver and one or more magnetic field antennas are connected to the receiver for the duration of the impulse noise.

12 Claims, 3 Drawing Figures

ADAPTIVE HYBRID ANTENNA SYSTEM

TECHNICAL FIELD

The invention relates to an aircraft antenna system and more particularly to an antenna system for use with airborne radio-navigation equipment.

BACKGROUND OF PRIOR ART

The present invention relates to a switching system for connecting a select antenna to a receiver, and more particularly to a hybrid antenna system for use with a VLF/Omega navigation system in which the better performing antenna of a dual antenna system is connected to a receiver.

A VLF/Omega navigational system is a world-wide system for assisting the navigation of airplanes and ships. The system includes a plurality of base stations located at selected points throughout the world. Each base station transmits an information signal having a unique frequency which is associated with the location of the station. The VLF/Omega information signals are in the low frequency range of 10-24 KHz. An aircraft using the navigational system receives one or more of the signals transmitted by the base stations. A computer on board the aircraft determines the phase or time of arrival of signals from three or more stations and computes the vehicle's location by trilateration, or hyperbolic computations.

The information signals which are transmitted by the base stations can be received by either a magnetic field (H-field) antenna or an electrical field (E-field) antenna. It is generally desirable to utilize an E-field antenna to receive the information signals, since this type of antenna is more sensitive and provides a stronger signal to the receiver. However, the E-field antenna is also sensitive to impulse noise, such as precipitation static, which has a relatively strong electrical field but a weak magnetic field. Precipitation static is caused when an aircraft flying through clouds containing particles such as ice crystals which become highly charged as a result of triboelectric or frictional charging, resulting in a corona discharge from some portion of the aircraft whenever the DC potential of the charge exceeds a threshold value. Each corona discharge results in static which is received by the receiver. The resulting precipitation static can take place at rates in the audio frequency range, and therefore interfere with the operation of the navigational system.

Impulse noise occurs frequently enough to create significant problems when using the navigational system. Consequently, most aircraft utilizing the VLF/Omega navigation system employ an H-field antenna to receive the information signals, since this type of antenna is nearly immune to the effects of impulse noise such as precipitation static. However, the use of such an antenna is not as sensitive to the low frequency information signals and therefore provides a weaker signal. In addition, the H-field antenna is susceptible to on-board electromagnetic interference, which causes further weakening of the information signals.

It is therefore an object of the present invention to provide a novel antenna system which makes optimum use of the desirable characteristics of E-field and H-field antennas.

A radio receiving apparatus which is responsive to both electrical and magnetic field components of a transmitted signal is disclosed in U.S. Pat. No. 3,475,687, issued to J. R. Pierce. In the apparatus disclosed in this patent, the signals from an E-field antenna and two orthogonal H-field antennas are combined and passed to a receiver. The disclosed apparatus does not include a provision for switching between the various antennas, and therefore has the drawback that the disadvantages as well as the advantages of the two types of antennas will have an effect upon the resulting output signal. Thus, the output signal will have static as a result of the sensitivity of E-field to impulse noise and will be weakened due to the sensitivity of the H-field antenna to electromagnetic interference, among other things.

It is therefore another object of the present invention to provide a novel hybrid antenna system which makes optimum use of two diverse types of antennas and suppresses the undesirable effects of the antennas and upon the resulting output signal.

An antenna system which includes a device for selecting between the output of one of a plurality of H-field antennas or an E-field antenna is disclosed in U.S. Pat. No. 3,718,932, issued to K. Ikrath et al. In the disclosed device of this patent, the selection device consists of manually-operated switches. The manually-operated switches are not desirable for use in the environment of a navigation system, however. For example, the output signal from the E-field antenna may be initially selected. When impulse noise occurs, an operator may disconnect the E-field antenna and connect one of the H-field antennas to a receiver system. In this situation, however, the operator will not know when the impulse noise has ceased, and therefore will not be able to reconnect the E-field antenna at the appropriate time. Instead, he must periodically disconnect the H-field antenna and connect the E-field antenna if he wishes to determine whether the impulse noise continues to be present.

It is therefore a further object of the present invention to provide a novel hybrid antenna system in which the selection of the better performing one of two antennas is automatic.

It is yet another object of the present invention to provide a novel hybrid antenna system in which at least one component of a received electromagnetic signal is continuously monitored to control connection of a select antenna to a receiver in an optimum manner.

Systems for selecting between one of two or more received signals and applying one of the signals to a receiver in response to certain signal quality criteria are disclosed in U.S. Pat. Nos. 1,934,211 and 2,968,718, for example. In the systems of these patents, the quality of signal strength or signal-to-noise ratio is evaluated and used to determine which of a plural number of received signals are to be passed on to a receiver. These systems do not relate to the detection of impulse noise and are not suitable in an environment such as a navigational system, for example, in which it is desirable to utilize the signal from a predetermined antenna under normal conditions and to apply the signal from a second antenna to a receiver only under certain circumstances, such as the occurrence of impulse noise.

It is therefore another object of the present invention to provide a novel hybrid antenna system which is particularly adapted for use in navigational systems.

It is a further object of the present invention to provide a novel hybrid antenna system in which a predetermined antenna is normally connected to a receiver except under certain circumstances.

These as well as other objects and advantages of the present invention will be apparent to one of ordinary skill in the art from a perusal of the following description when taken in cojunction with the accompanying drawings.

SUMMARY OF THE INVENTION

The invention comprises a hybrid antenna system, particularly suitable for the reception of airborne radio-navigation signals, wherein an impulse-noise detector monitors incoming signals and affects an automatic selection of either an E-field antenna or an H-field antenna so as to optimize signal reception, such selection being based upon a comparison of the quality of the instantaneous magnetic and electrical components of the input signals to the two antennas.

DETAILED DESCRIPTION OF INVENTION

The present invention is disclosed in conjunction with a hybrid antenna system which is particularly adapted for use in a VLF/Omega navigational system. However, it will be apparent that the invention is not limited to such an environment and is applicable to any system in which one component of a received signal is to be applied to a receiver in response to the quality of at least one of the components of the signal.

Figure 1:
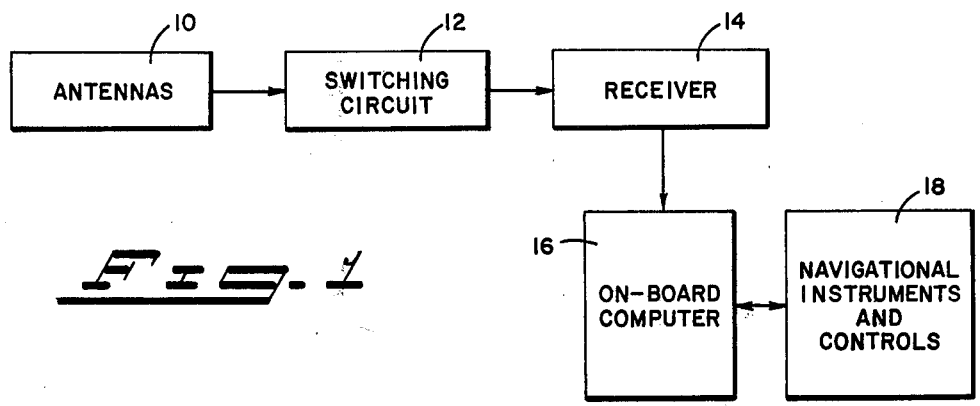
FIG. 1 is a block diagram of the general on-board components of a navigational system.

A block diagram illustrating the basic on-board components of a VLF/Omega navigational system embodying the present invention is illustrated in FIG. 1. The low frequency electromagnetic information signals transmitted by the navigational system base stations are received by a plurality of antennas 10, including an E-field antenna and at least one H-field antenna.

The antennas 10 are connected to a switching circuit 12 which evaluates the quality of the signals received by the respective antennas and selectively connects one of the antennas to a receiver 14 in response to the evaluated quality of at least one component of the received signal. Preferably, the switching circuit monitors the output signal from the E-field antenna, and normally connects the E-field antenna to the receiver 14. When impulse noise is detected in the signal coming from the E-field antenna, the switching circuit 12 disconnects this antenna from the receiver and connects the H-field antennas to the receiver 14.

The receiver 14 includes suitable circuitry (not shown) for processing the information signals presented to it by the antenna selected by the switching circuit 12. The receiver 14 transforms the received information signals into data signals which are passed on to an on-board computer 16. The computer 16 determines, among other things, the time of arrival or phase of the various information signals, and utilizes this information to calculate the precise location of the aircraft. The location of the aircraft is corollated with wind direction and speed, as well as other factors, to establish the proper course of flight for arrival at the aircraft's final destination. Control signals for the proper course of flight are then transmitted to various navigational instrument and control systems 18 to place the aircraft on the proper flight course.

Figure 2:
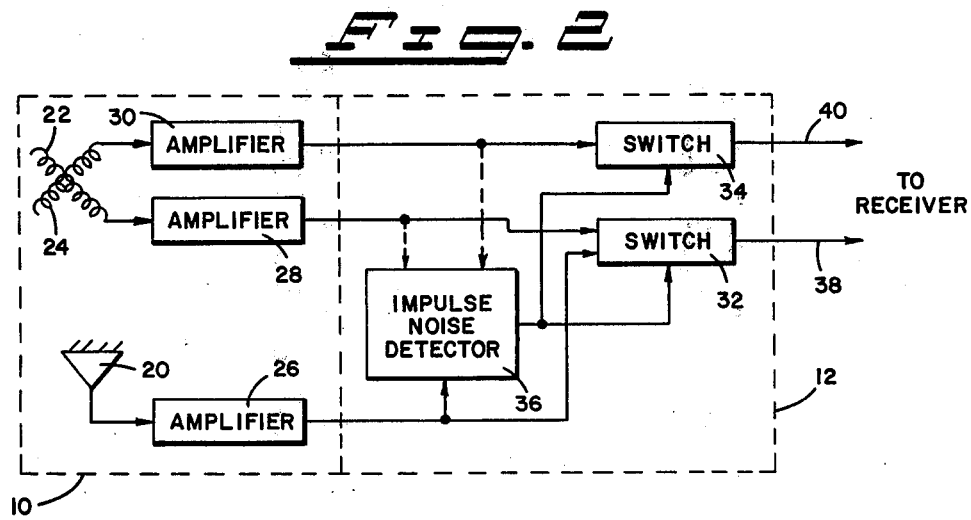
FIG. 2 is a block diagram of the preferred embodiment of a hybrid antenna and switching system constructed in accordance with the present invention.

A preferred embodiment of a hybrid antenna system constructed in accordance with the present invention is illustrated in FIG. 2. The antennas 10 include an omnidirectional E-field antenna 20 and two orthogonally disposed H-field antennas 22, 24. The E-field antenna receives the electrical component of an electromagnetic information signal and the H-field antennas receive the magnetic field component of the electromagnetic information signal.

The E-field antenna 20 is a grounded dipole antenna, and preferably a suppressed plate cavity antenna. The two H-field antennas 22, 24, are crossed-looped antennas disposed at right angles to one another. Preferably, these antennas can be two perpendicular ferrite core loop antennas having shielded coils. The signal received at each antenna is passed to a respective amplifier 26, 28, 30.

The amplified output signals from the antennas 20, 22, 24 are applied to the input terminals of two electrically controlled switches 32, 34. A first switch 32 includes two input terminals which are respectively connected to the amplifier 26 associated with the E-field antenna 20 and to the amplifier 28 associated with one of the H-field antennas 22. The other switch 34 has one input terminal which is connected to the amplifier 30 associated with the other H-field antenna 24. The switches 32, 34 are controlled by an impulse noise detector 36 to selectively connect either the E-field antenna 20 or the two H-field antennas 22, 24 to a pair of transmission lines 38, 40.

The impulse noise detector 36 monitors the electrical component of the electromagnetic information signal, which electrical component is received by the E-field antenna 20, and produces an output signal whenever impulse noise is detected in the electrical component of the signal received by the E-field antenna 20. The impulse noise detector can comprise, for example, a differential comparator which is biased so as to be triggered by impulse noise. Impulse noise is generally several orders of magnitude greater than random noise, and therefore the differential comparator forming the impulse noise detector will not be responsive to ordinary random noise in the electromagnetic information signal. The bias level of the differential comparator can be set at the anticipated level of the information signal, for example. In this manner, only impulse noise which is greater than the information signal and which causes static in the signal received at the receiver 14 will cause the impulse noise detector 36 to produce an output signal. Alternatively, the differential comparator can be constructed so as to automatically set the bias level at the amplitude level of the incoming electromagnetic information signal such that only impulse noise greater than the information signal will trigger the comparator. In this manner, ordinary random noise will not effect the impulse noise detector 36. It is preferable to utilize two differential comparators for the impulse noise detector to provide the capability of detecting impulse noise of either polarity.

In operation, the movable contacts of the switches 32, 34 are normally positioned so that the E-field antenna 20 is connected to the transmission line 38 and the transmission line 40 is not connected to any antenna. When impulse noise is detected in the output signal from the E-field antenna 20, the impulse noise detector 36 produces an output signal which causes the switches 32, 34 to perform a switching action. In this position, the two H-field antennas 22, 24 are respectively connected to the two transmission lines 38, 40, and the E-field antenna 20 is disconnected from the transmission line 38.

The transmission lines 38, 40 are connected to the receiver 14. The receiver includes suitable logic circuitry (not shown) for detecting whether the electrical or the magnetic component of the information signal is being received, to switch the receiver into the proper mode of operation. For example, in the disclosed embodiment, the logic circuitry can detect whether noise is present on one or both of the transmission lines 38, since the other transmission line 40 is disconnected and therefore will have no noise on it. The logic circuit will detect the noise and determine that the electricl component of the information signal is being received to switch the receiver into the proper mode of operation. Alternatively, if the H-field antennas 22, 24 are connected to the transmission lines 38, 40, the logic circuit will detect noise on both of the transmission lines and switch the receiver into the magnetic component mode of operation. In this latter mode of operation, the receiver then chooses between the two H-field antennas 22, 24 in dependence upon the direction of arrival of the electromagnetic information signal.

The amplified output signals from the two H-field antennas 22, 24 can optionally be applied as input signals to the impulse noise detector 36, as indicated by dotted lines in FIG. 2. With this arrangement, the impulse noise detector can perform functions other than the detection of impulse noise per se. For example, the impulse noise detector can perform a comparison of the quality of the magnetic and electrical components of the received information signal and control the switches 32, 34 so as to provide the best component of the received signal to the receiver 14.

Figure 3:
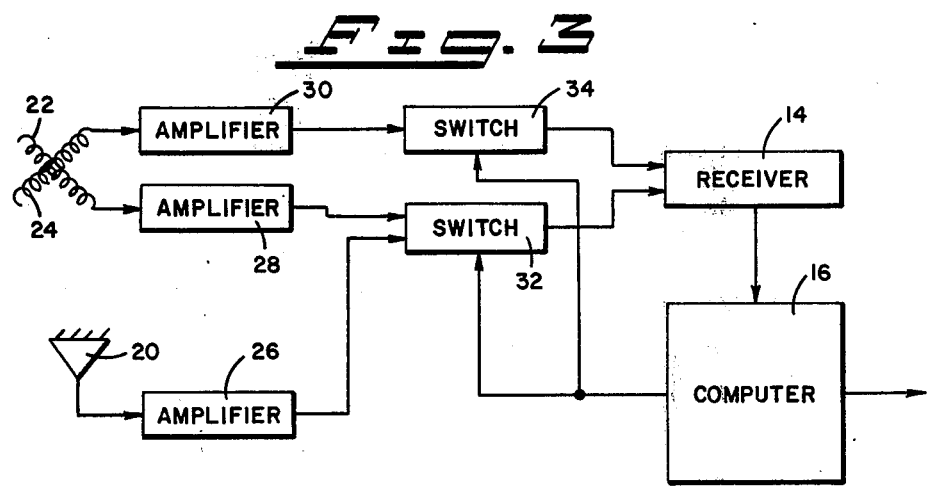
FIG. 3 is an alternative embodiment of a switching system constructed in accordance with the teachings of the present invention.

An alternative embodiment of a hybrid antenna system constructed in accordance with the present invention is illustrated in FIG. 3. In this embodiment, the computer 16 performs the function of the impulse noise detector as well as the other control functions previously discussed. Under normal conditions, the switch 32 will connect the E-field antenna 20 to the receiver 14 and both of the H-field antennas 22, 24 will be disconnected from the receiver 14. When impulse noise is received by the E-field antenna 20 to the receiver 14 and both of the H-field antennas 22, 24 will be disconnected from the receiver 14. When impulse noise is received by the E-field antenna 20 and causes the receiver 14 to produce an unintelligible data signal, the computer 16 will actuate the switches 32, 34 to connect the H-field antennas 22, 24 to the receiver 14 and disconnect the E-field antenna 20 therefrom. Thereafter, the computer 16 can cause the switches 32, 34 to periodically disconnect the H-field antennas 22, 24 from the receiver 14 and connect the E-field antenna 20 to the receiver to sample whether impulse noise is still present. As long as the impulse noise is present, the computer will cause the switches 32, 34 to reconnect the H-field antennas to the receiver 14. However, when impulse noise is no longer detected, the computer 16 will cause the switches 32, 34 to reconnect the E-field antenna 20 to the receiver 14 and disconnect the H-field antennas therefrom.

From the foregoing, it can be seen that the present invention provides optimal use of both E-field and H-field antennas in a receiver for a VLF/Omega navigational system. The switching system eliminates radio interference in the navigational system receiver normally caused by precipitation static without compromising upon the quality of the signal utilized by the receiver. The generally more desirable electrical component of the electromagnetic information signal is normally coupled to the receiver and monitored for the presence of impulse noise. When impulse noise is detected, the magnetic component of the received information signal is passed to the receiver only for so long as the duration of the impulse noise.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

INDUSTRIAL APPLICATION

The antenna system comprising the invention is particularly suited to the reception of VLF/Omega navigation signals aboard an aircraft.

I claim:

1. An airplane hybrid antenna system for receiving an electromagnetic information signal transmitted within a VLF/Omega navigation system, said antenna system comprising:
   electric field antenna means for receiving the electric component of said electromagnetic signal;
   magnetic field antenna means for receiving the magnetic component of said electromagnetic signal;
   means for detecting and monitoring the impulse noise in said electric component of said electromagnetic signal received by said electric field antenna means, said detecting and monitoring means being operative to produce an output signal when the amplitude of the detected impulse noise reaches a predetermined level;
   means for transmitting the signals received by said electric field and magnetic field antenna means to a receiver; and
   switch means adapted for normally connecting said electric field antenna means to said transmitting means, said switch means being operative in response to said output signal from said detecting and monitoring means to connect said magnetic field antenna means to said transmitting means.

2. The airplane hybrid antenna system of claim 1 wherein said switch means disconnects said electric field antenna means from said transmitting means in response to said output signal.

3. The airplane hybrid antenna system of claim 1 wherein said electric field antenna means comprises a dipole antenna.

4. The airplane hybrid antenna system of claim 1 wherein said magnetic field antenna means comprises a crossed-loop antenna.

5. The airplane hybrid antenna system of claim 4 wherein said magnetic field antenna means comprises two perpendicularly disposed ferrite core loop antennas.

6. The airplane hybrid antenna system of claim 5 wherein said transmitting means includes two transmission lines and said switch means connects each of said transmission lines respectively to one of said loop antennas.

7. The airplane hybrid antenna system of claim 1 wherein said means for detecting and monitoring incudes a differential comparator, the bias level of which is set at the anticipated level of said information signal.

8. The airplane hybrid antenna system of claim 1 wherein said means for detecting and monitoring includes a differential comparator adapted to automatically set the bias level of said differential comparator at the amplitude level of said information signal.

9. The airplane hybrid antenna system of claim 1 wherein said means for detecting and monitoring includes two differential comparators.

10. The method of maximizing the performance of a VLF/Omega navigation system receiver located in an aircraft by providing to said receiver a selected and preferred component of an electromagnetic information signal transmitted within said VLF/Omega navigation system, comprising the steps of:
   receiving the electric component of said electromagnetic information signal with an electric field antenna;
   receiving the magnetic component of said electromagnetic information signal with a magnetic field antenna;
   transmitting to said receiver the signal received by said electric field antenna;
   detecting and monitoring the level of impulse noise in the signal received by said electric field antenna;
   interrupting transmission of the signal from said electric field antenna when the detected impulse noise level exceeds a predetermined amplitude; and
   transmitting to said receiver the signal received by said magnetic field antenna while the signal from said electric field antenna is interrupted.

11. The method of maximizing receiver performance according to claim 10 wherein the step of interrupting transmission of said electric field antenna signal is carried out when said impulse noise level exceeds the level of said information signal.

12. An airplane hybrid antenna system for receiving an electromagnetic information signal transmitted within a VLF/Omega navigation system, said antenna system comprising:
   electric field antenna means for receiving the electric component of said electromagnetic signal;
   magnetic field antenna means for receiving the magnetic component of said electromagnetic signal;
   means for transmitting the signals received by said electric field antenna means and said magnetic field antenna means to a receiver, said receiver being adapted to produce a data signal representative of said transmitted signals;
   means for monitoring said data signal, said monitoring means being operative to produce an output signal when said data signal is rendered unintelligible by impulse noise; and
   switch means adapted for normally connecting said electric field antenna means to said transmitting means, said switch means being operative in response to said output signal from said monitoring means to connect said magnetic field antenna means to said transmitting means.

* * * * *